UNITED STATES PATENT OFFICE.

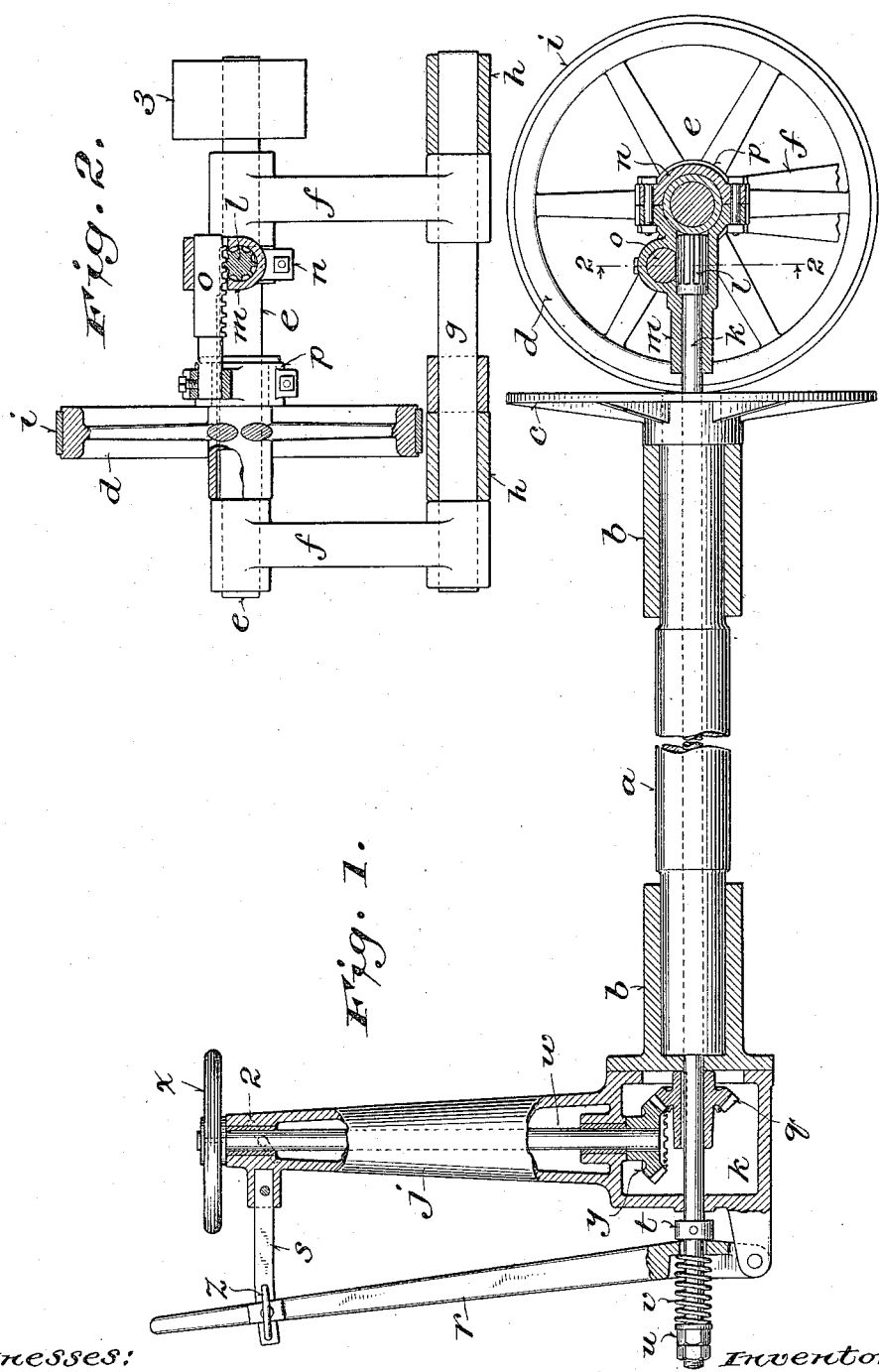

GEORGE M. PELTON, OF MILWAUKEE, WISCONSIN, ASSIGNOR TO THE FILER & STOWELL COMPANY, OF MILWAUKEE, WISCONSIN, A CORPORATION OF WISCONSIN.

FRICTION-GEARING.

1,169,282.  Specification of Letters Patent.  Patented Jan. 25, 1916.

Original application filed July 25, 1910, Serial No. 573,726. Divided and this application filed January 30, 1914. Serial No. 815,328.

*To all whom it may concern:*

Be it known that I, GEORGE M. PELTON, a citizen of the United States, residing at Milwaukee, in the county of Milwaukee and State of Wisconsin, have invented certain new and useful Improvements in Friction-Gearing, of which the following is a specification, reference being had to the accompanying drawing, forming a part thereof.

This invention relates more particularly to gearing comprising friction wheels having their axes at right angles to each other so that the periphery of one will engage with a side or end face of the other.

The main objects of the invention are to provide such gearing with simple and effective means for controlling its operation at a distant and easily accessible point, to facilitate stopping, starting and regulating the speed of the driven member of such gearing, and generally to improve the construction and operation of gearing of this class.

It consists in the construction, arrangement and combination of parts as hereinafter particularly described and pointed out in the claims.

For the purpose of illustration and explanation the gearing is shown and described as specially designed for use in a resawing machine to operate the feeding mechanism, but with little or no change in construction it may be used for other purposes or in other machines where a variable-speed drive is desired.

In the accompanying drawing like characters designate the same parts in both figures.

Figure 1 is a view partly in elevation and partly in vertical longitudinal section, of gearing embodying the invention; and Fig. 2 is a vertical cross section on the line 2—2, Fig. 1.

A tubular shaft $a$, which may be one of the band wheel shafts of a resawing machine, is supported at the ends in bearings $b$, and provided at one end with a side or end faced friction wheel $c$, which in the present case is regarded as the driving wheel, although the relation of the driving and driven members of the gearing may be reversed, and the wheel $c$ may be the driven member.

A friction wheel $d$, which will be considered as the driven member, although it may be the driving member, is mounted on and movable lengthwise of a transverse shaft $e$, carried by rocker arms $f$ at right angles to the shaft $a$, opposite the stationary or driving wheel $c$. The arms $f$ are mounted parallel with each other on a rocker shaft $g$, which is parallel with the shaft $e$, and is supported in stationary bearings $h$.

The wheel $d$, the periphery of which is preferably provided as shown, with a leather, fiber or other suitable facing $i$, for engagement with the driving friction wheel $c$, is feathered as shown in Fig. 2 on the shaft $e$, so that it will when rotated, turn said shaft and at the same time be freely shiftable lengthwise thereof.

To the bearing $b$ or other fixed support at the end of the shaft $a$ opposite the wheel $c$, a hollow post or stand $j$ is attached.

A rod $k$ passing through and rotatable and movable lengthwise in the tubular shaft $a$, is provided at the end adjacent to the wheel $c$ with a pinion $l$, which is incased in a head or housing $m$, forming a bearing for said rod next to the pinion, and provided with a box $n$, encircling the shaft $e$, or one of its bearings. The pinion $l$, head $m$ and box $n$ constitute a swivel connection between the rod $k$ and the shaft $e$, or one of its movable bearings. A rack $o$, guided in a transverse opening in the head $m$ parallel with the shaft $e$ and in mesh with the pinion $l$, is connected by a collar $p$ with the driven or shiftable wheel $d$, the hub of said wheel being free to turn, but immovable endwise in said collar. The rod $k$ passes through the hollow post or stand $j$, and is provided therein with a bevel gear $q$, which is feathered thereon. The protruding end of the rod $k$ on the outer side of the post $j$, passes through an opening in a hand lever $r$, fulcrumed at its lower end to said post and guided at its upper end on a curved arm $s$, attached to said post. The rod $k$ is provided with a collar or shoulder $t$, with which the lever $r$ engages on the inner side thereof, and between the outer side of said lever and a nut or abutment $u$ on the end of the rod, a spring $v$ is interposed, which provides for a yielding or elastic engagement between the friction wheels $c$ and $d$ when they are brought and held together by said lever.

A vertical shaft $w$, journaled in the post or stand $j$ and provided at its upper end with a hand wheel $x$ and at its lower end with a bevel gear $y$ meshing with the gear $q$, affords means for turning the rod $k$ to shift the wheel $d$ toward and from the center of the wheel $c$, thereby varying its speed, if, as in the present case, it is the driven member, or varying the speed of the wheel $c$ in case that is the driven member.

The lever $r$ is locked and held in adjusted position by the hand screw $z$, and the hand wheel $x$ with the shaft $w$ and its connections, is locked and held in adjusted position by the hand screw 2, as indicated by dotted lines in Fig. 1.

The shaft $e$ may be provided, as shown in Fig. 2, with a pulley 3 or other means for transmitting power therefrom or thereto.

The friction wheel $d$ is moved into and out of engagement with the friction wheel $c$ and the driven member of the gearing is thus started and stopped by the manipulation of the lever $r$, while for varying the speed of the driven member, the wheel $d$ is shifted axially toward and from the center of the wheel $c$ by the manipulation of the hand wheel $x$.

The lever $r$ and hand wheel $x$ being located close together, enable the operator without changing his position, to easily stop and start the friction wheel $c$ or $d$, whichever may be the driven member, and to vary the speed of the driven member by shifting the wheel $d$ axially.

Various changes in details of construction and arrangement of parts may be made within the principle and scope of the invention as defined in the following claims.

This application is a division of my application Serial No. 573,726, filed July 25, 1910, for improvements in resewing machines on which Letters Patent No. 1,109,012 were issued September 1, 1914.

I claim:

1. In friction gearing the combination with friction wheels having their axes at right angles to each other, one being movable transversely to its axis into and out of engagement with the other, of a longitudinally movable rod coaxial with the stationary wheel and connected with the shiftable wheel for throwing it into and out of engagement with the stationary wheel, and a lever connected with said rod.

2. In friction gearing the combination with friction wheels having their axes at right angles to each other, one being movable lengthwise of its axis toward and from the center of the other, of a rotary rod coaxial with the stationary wheel and connected with the shiftable wheel, and means for turning said rod.

3. In friction gearing the combination with friction wheels having their axes at right angles to each other, one being movable transversely to its axis into and out of engagement with the other, of a longitudinally movable rod coaxial with the stationary wheel and connected with the shiftable wheel, and a lever having a yielding connection with said rod and adapted to shift said rod lengthwise and to carry the shiftable wheel into and out of engagement with the stationary wheel.

4. In friction gearing the combination with friction wheels having their axes at right angles to each other, one being movable lengthwise of its axis toward and from the center of the other, of a rotary rod coaxial with the axis of the stationary wheel, a pinion on said rod, a rack connected with the shiftable wheel parallel with its axis and meshing with said pinion, and means for turning said rod.

5. In friction gearing the combination with friction wheels having their axes at right angles to each other, one being movable transversely to its axis into and out of engagement with the other and lengthwise of its axis toward and from the center of the other, of a rotary and longitudinally movable rod coaxial with the stationary wheel and having a swivel connection with the axis of the shiftable wheel, and a rack and pinion connection with said shiftable wheel, means for manually turning said rod, and means for shifting it lengthwise.

6. In friction gearing the combination of a tubular shaft provided with a friction wheel at one end, a shaft arranged at right angles to said tubular shaft opposite said friction wheel and movable toward and from the same, a friction wheel mounted on said movable shaft and movable axially toward and from the center of the other friction wheel, a rotary and longitudinally movable rod passing through said tubular shaft and having a swivel connection with said movable shaft, a pinion on said rod, a rack connected with said shiftable wheel parallel with its axis and meshing with said pinion, and means for manually turning said rod and shifting it lengthwise in said tubular shaft.

7. In friction gearing the combination of a tubular shaft provided with a friction wheel at one end, a shaft arranged at right angles to said tubular shaft opposite said friction wheel and movable toward and from the same, a friction wheel mounted on said movable shaft and movable axially toward and from the center of the other friction wheel, a rotary and longitudinally movable rod passing through said tubular shaft and having a swivel connection with said movable shaft, a pinion on said rod, a rack connected with said shiftable wheel parallel with its axis and meshing with said pinion, a lever having a yielding connection with said rod and adapted to shift it lengthwise in said tubular shaft, a shifting shaft, bevel gears connecting said shaft with said rod, and means for manually turning said shifting shaft.

In witness whereof I hereto affix my signature in presence of two witnesses.

GEORGE M. PELTON.

Witnesses:
 CHAS. L. GOSS,
 FRANK E. DENNETT.

Copies of this patent may be obtained for five cents each, by addressing the "Commissioner of Patents, Washington, D. C."